United States Patent
Keskitalo et al.

(10) Patent No.: US 9,813,889 B2
(45) Date of Patent: Nov. 7, 2017

(54) METHOD AND APPARATUS FOR IMPROVED MOBILITY ESTIMATION BASED ON A SCALING FACTOR

(71) Applicant: NOKIA CORPORATION OY, Espoo (FI)

(72) Inventors: Ilkka Keskitalo, Oulu (FI); Lars Dalsgaard, Oulu (FI); Jani Puttonen, Palokka (FI); Fedor Chernogorov, Jyväskylä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/442,920

(22) PCT Filed: Jan. 6, 2014

(86) PCT No.: PCT/IB2014/058079
§ 371 (c)(1),
(2) Date: May 14, 2015

(87) PCT Pub. No.: WO2014/108823
PCT Pub. Date: Jul. 17, 2014

(65) Prior Publication Data
US 2015/0296367 A1 Oct. 15, 2015

Related U.S. Application Data

(60) Provisional application No. 61/750,553, filed on Jan. 9, 2013.

(51) Int. Cl.
*H04W 4/00* (2009.01)
*H04W 8/08* (2009.01)
(Continued)

(52) U.S. Cl.
CPC ............. *H04W 8/08* (2013.01); *H04W 24/02* (2013.01); *H04W 64/006* (2013.01); *H04W 76/048* (2013.01)

(58) Field of Classification Search
CPC ..... H04W 8/08; H04W 24/02; H04W 64/006; H04W 76/048
See application file for complete search history.

(56) References Cited

U.S. PATENT DOCUMENTS

2013/0040692 A1* 2/2013 Chen .................... H04W 36/04
455/525
2013/0244664 A1* 9/2013 Song ................. H04W 36/0083
455/437
(Continued)

FOREIGN PATENT DOCUMENTS

WO 2012138124 A2 10/2012
WO 20130066120 A1 5/2013
(Continued)

OTHER PUBLICATIONS

International Search Report and Written Opinion received for corresponding Patent Cooperation Treaty Application No. PCT/IB2014/058079, dated Oct. 16, 2014, 15 pages.
(Continued)

*Primary Examiner* — Abdelnabi O Musa
(74) *Attorney, Agent, or Firm* — Squire Patton Boggs (US) LLP

(57) ABSTRACT

An apparatus, method, and computer program product for mobility estimation are provided. One method may include estimating a mobility state of a user equipment, and scaling the estimate of the mobility state according to certain factors. The factors may include, for example, a DRX cycle applied during the period of estimation of the mobility state and the number of cell changes of the user equipment.

20 Claims, 6 Drawing Sheets

(51) Int. Cl.
*H04W 24/02* (2009.01)
*H04W 64/00* (2009.01)
H04W 76/04 (2009.01)

(56) References Cited

U.S. PATENT DOCUMENTS

2014/0029541 A1* 1/2014 Jung .................... H04L 5/0096
370/329
2015/0215830 A1* 7/2015 Dalsgaard ......... H04W 36/0094
455/444

FOREIGN PATENT DOCUMENTS

| WO | 2013100659 A1 | 7/2013 |
| WO | 20130114155 A1 | 8/2013 |
| WO | 20130138225 A1 | 9/2013 |

OTHER PUBLICATIONS

Extended European Search Report dated Nov. 11, 2016, issued in corresponding Application No. 14737798.0.
Nokia Siemens Networks et al., "Improved Mobility State Estimation", 3GPP TSG-RAN WG2, Meeting #77bis, R2-121624. Mar. 26-30, 2012. pp. 1-6.
New Postcom, "Impact from CRE and ABS on connection failures in HetNet", 3GPP TSG RAN WG3 Meeting #75bis. R3-120581. Mar. 26-30, 2012. pp. 1-11.
European Office Action dated Jul. 31, 2017, issued in corresponding EP Application No. 14737798.0.

* cited by examiner

METHOD AND APPARATUS FOR IMPROVED MOBILITY ESTIMATION BASED ON A SCALING FACTOR

RELATED APPLICATION

This application was originally filed as Patent Cooperation Treaty Application No. PCT/IB2014/058079 filed Jan. 6, 2014 which claims priority benefit to U.S. Provisional Patent Application No. 61/750553, filed Jan. 9, 2013.

CROSS REFERENCE TO RELATED APPLICATIONS

This application claims priority to U.S. Provisional Application No. 61/750,553, filed on Jan. 9, 2013. The entire contents of this earlier filed application is hereby incorporated by reference in its entirety.

BACKGROUND

Field

Embodiments of the invention generally relate to wireless communication systems, such as, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A). Some embodiments relate to mobility estimation in such communication systems.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (evolved Node B, also called E-UTRAN Node B).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD). Advantages of LTE are, for example, high throughput, low latency, FDD and TDD support in the same platform, an improved end-user experience, and a simple architecture resulting in low operating costs.

Further releases of 3GPP LTE (e.g., LTE Rel-11, LTE-Rel-12) are targeted towards future international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to a method including estimating, by a user equipment associated with a network, a mobility state of the user equipment, and scaling the mobility state estimate according to at least one scaling factor.

Another embodiment is directed to an apparatus including at least one processor, and at least one memory comprising computer program code. The at least one memory and the computer program code are configured, with the at least one processor, to cause the apparatus at least to estimate a mobility state of a user equipment associated with a network, and scale the mobility state estimate according to at least one scaling factor.

Another embodiment is directed to a computer program, embodied on a computer readable medium, the computer program configured to control a processor to perform a process. The process includes estimating a mobility state of a user equipment associated with a network, and scaling the mobility state estimate according to at least one scaling factor.

Another embodiment is directed to an apparatus including means for estimating a mobility state of a user equipment associated with a network, and means for scaling the mobility state estimate according to at least one scaling factor.

Another embodiment is directed to a method including receiving, by a network node, a number of cell changes from a user equipment. The method may further include determining scaling factors, and scaling a mobility state estimate of the user equipment according to the scaling factors and the received number of cell changes.

Another embodiment is directed to an apparatus including at least one processor, and at least one memory comprising computer program code. The at least one memory and the computer program code are configured, with the at least one processor, to cause the apparatus at least to receive a number of cell changes from a user equipment, determine scaling factors, and scale a mobility state estimate of the user equipment according to the scaling factors and the received number of cell changes.

Another embodiment is directed to a computer program, embodied on a computer readable medium, the computer program configured to control a processor to perform a process. The process includes receiving a number of cell changes from a user equipment, determining scaling factors, and scaling a mobility state estimate of the user equipment according to the scaling factors and the received number of cell changes.

Another embodiment is directed to an apparatus including means for receiving a number of cell changes from a user equipment, means for determining scaling factors, and means for scaling a mobility state estimate of the user equipment according to the scaling factors and the received number of cell changes.

BRIEF DESCRIPTION OF THE DRAWINGS

For proper understanding of the invention, reference should be made to the accompanying drawings, wherein.

DETAILED DESCRIPTION

Figure 1A:
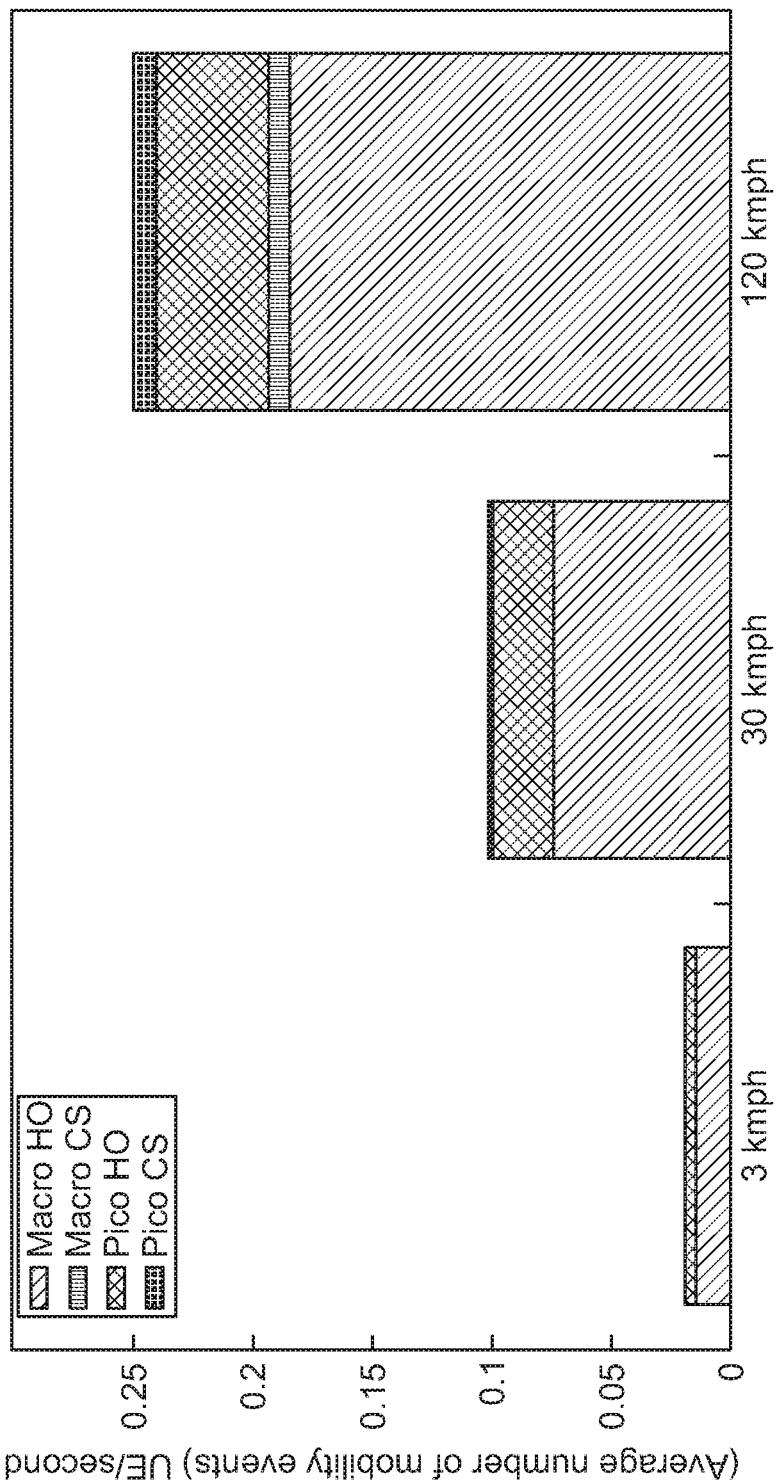
FIGS. 1a, 1b and 1c illustrate the average counted mobility events with three different DRX configurations, according to an embodiment.

It will be readily understood that the components of the invention, as generally described and illustrated in the figures herein, may be arranged and designed in a wide variety of different configurations. Thus, the following detailed description of embodiments of methods, systems, apparatuses, and computer program products for mobility estimation, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

There are several circumstances in which it may be beneficial to know or identify the UE mobility state in order to make optimized configurations or determine optimized parameter values for various purposes. The UE mobility state, according to one embodiment, may include information as to whether the UE is moving and a possible mobility type, such as slow, medium, or fast. There have been several studies and work items where the mobility estimation in the form of actual velocity or more simple mobility state (e.g., relative mobility activity over a given time period) has been discussed in 3GPP. The mobility estimate can be particularly useful for mobility parameter optimization in heterogeneous networks (in general mixed network deployments, e.g., with offloading cells or hotspots deployed) and for the mobility indication as part of the UE assistance information for smart phone optimization.

In the latter case, the mobility indication may help the network to decide when it would be beneficial to release the connection and when to keep the UE in connected state. This may be done in order to minimize the signaling load, which is a trade-off between the state transition and mobility related signaling.

The mobility state estimation (MSE) has been defined in 3GPP LTE Rel.8 for E-UTRAN (and also in legacy systems) to allow scaling of the mobility parameter values based on the estimated mobility. The mobility state is categorized as normal, medium, and high mobility state based on which parameter scaling is done according to given equations.

The parameters to be adjusted are, for example, the hysteresis value, Qhyst and Treselection, for cell re-selection function (TS 36.304, 5.2.4.3) or time to trigger (TTT) for connected state mobility (TS 36.331, 5.5.6.2). The UE measurements can be done during both idle and connected state. During the connected state, the mobility can also be estimated by the network.

It is also commonly understood that unnecessary cell changes (ping-pong re-selection) should be removed from the MSE algorithm. For example, TS 36.304 states: "The UE shall not count consecutive reselections between same two cells into mobility state detection criteria if same cell is reselected just after one other reselection." How this is done is left up to the UE implementation.

E-UTRAN also allows the UE to be configured with discontinuous reception (DRX) in connected state in order to allow power savings on the terminal side by allowing 'sleep' times between the active receptions or monitoring of the physical downlink control channel (PDCCH). Also, in idle mode DRX is supported where the UE is allowed to sleep (i.e., turn off its reception) in between paging reception and other mandatory activity.

The connected mode DRX configuration defines the cycle of how often the UE shall listen to downlink channels and how long the active state will last (e.g., on-duration and inactivity timer). This cycle will be known by both the UE and the network thereby allowing synchronized operation. If the UE has to start uplink transmission, it can be initiated by a scheduling request (SR) on the physical uplink control channel (PUCCH), or by sending random access channel (RACH) if PUCCH is not available or in idle mode.

As mentioned above, 3GPPP LTE Rel. 11 addresses enhancements for diverse data applications eDDA and also introduces UE assistance information to enable the network to make optimized configuration for each UE in order to minimize the network signaling load (connection control), radio resource usage (control channel usage) and to minimize the UE power consumption (DRX configuration, connection release). As part of the UE assistance information, there is to be an indication about the UE mobility which would give further information on how the connection control should optimally be performed. However, there has been no resolution as to how the mobility should be estimated, whether it should be currently specified MSE, or something else.

It seems that UE DRX will clearly impact the MSE, both in idle (paging cycle) and connected states (configured DRX cycle). The UE measurement performance requirements are affected by DRX which in turn affects the number of cell changes. That the DRX, affects the UE mobility measurements also then means that DRX has influence on how and when the mobility events are triggered. This will also likely impact the mobility in form of amount of cell changes per time which has direct impact on MSE. Current MSE (or enhanced MSE) does not take these issues into account, but should be considered when defining a method of how the mobility indication is derived for the smart phone optimization, for instance. It should be understood that the DRX can be either the network configured DRX or the actual measurement period because the UE implementation has the freedom to wake up also more frequently than the configured DRX periodicity.

In view of the above, according to certain embodiments, the MSE estimate may be scaled according to the DRX cycle applied during the estimation period. The DRX is either the paging cycle in idle state, or the DRX (long) cycle in connected state—if configured. Alternatively, the scaling could be applied to the actual count values used in the algorithm for determining the MSE. The proposed count weight could be adjusted such that when DRX is applied the weight could be set higher thereby ensuring that the MSE will take into account the fewer amount of cell changes.

In some embodiments, the scaling of the MSE can be done for the thresholds used to separate the mobility states (e.g., normal, medium or high). When the DRX is applied, there will be less cell changes happening because the UE measurements and averaging will take a longer time. Hence, the cell change count will be lower for a given time period and, consequently, the thresholds should be adapted accordingly.

According to certain embodiments, specific rules may be provided on how the adjustment should be done. These rules may be specified in the 3GPP standard(s) or may be implementation specific. However, to achieve the same or similar behavior for all UEs, it may be beneficial to specify how the UE performs the adaptation based on UE measurement activity. In one embodiment, for example, the UE may perform the adaptation based on DRX configuration. The specified and configured method, according to an embodiment, also enables better use in the sense that the network and the UE will operate in a synchronized manner, and the network would be able to actively use the improved MSE when setting the MSE scaled mobility parameters. If the UE has used another, e.g., more frequent, measurement periodicity (which is an implementation option) than the configured DRX cycle, in one implementation of the method, the UE may either use the scaling factor based on the actual measurement period, or, if the scaling is done on the network side, the measurement period is indicated to the network along with the information about the number of cell changes.

In one embodiment, the rules may have further parameters which may either be fixed of configurable. In the former case, they will be specified in the 3GPP standard(s), and in the latter case, there may be additional configurable parameters defined and included in the specification(s).

Certain embodiments also provide other methods for how the mobility is estimated, which do not use the cell change counting. However, these methods may similarly be affected by the DRX and, therefore, the scaling could also be performed for those estimates as well.

In order to achieve more stable MSE, the mobility estimation may have to span over both idle and connected state. This may especially be desirable in the case of smart phones, for example, with frequent state changes due to intermittent traffic. If the estimation does not span over idle and connected mode, the estimation window may be too short to generate a stable mobility estimate. Therefore, according to an embodiment, the estimation interval may span over both idle state as well as preceding connected state. For smart phone optimization, the mobility indication is assumed to be sent to the network when the UE sets up the connection after being in idle mode. Then, immediately after connection setup, the network will know how to optimally configure the connection (e.g., parameters related to mobility, DRX etc.) or if it instead would be more beneficial to release the connection soon after the data transfer.

When both idle and connected state cell changes are taken into account when estimating the UE mobility, there will be at least two DRX cycles that should be considered—which may well also be different. Certain embodiments include a method and estimation rules that are able to cope with such a case as well. In one embodiment, the different DRX cycles may be scaled separately. For instance, according to an embodiment, the idle state cell re-selections based on paging cycle and the connected state handovers with applied DRX cycle (if configured) are scaled separately. Combining these two counts can also give weight to the relative duration of the idle and connected states. Once the counts have been scaled, the mobility state (e.g. normal, medium, high) can be determined as normally.

Figure 1B:
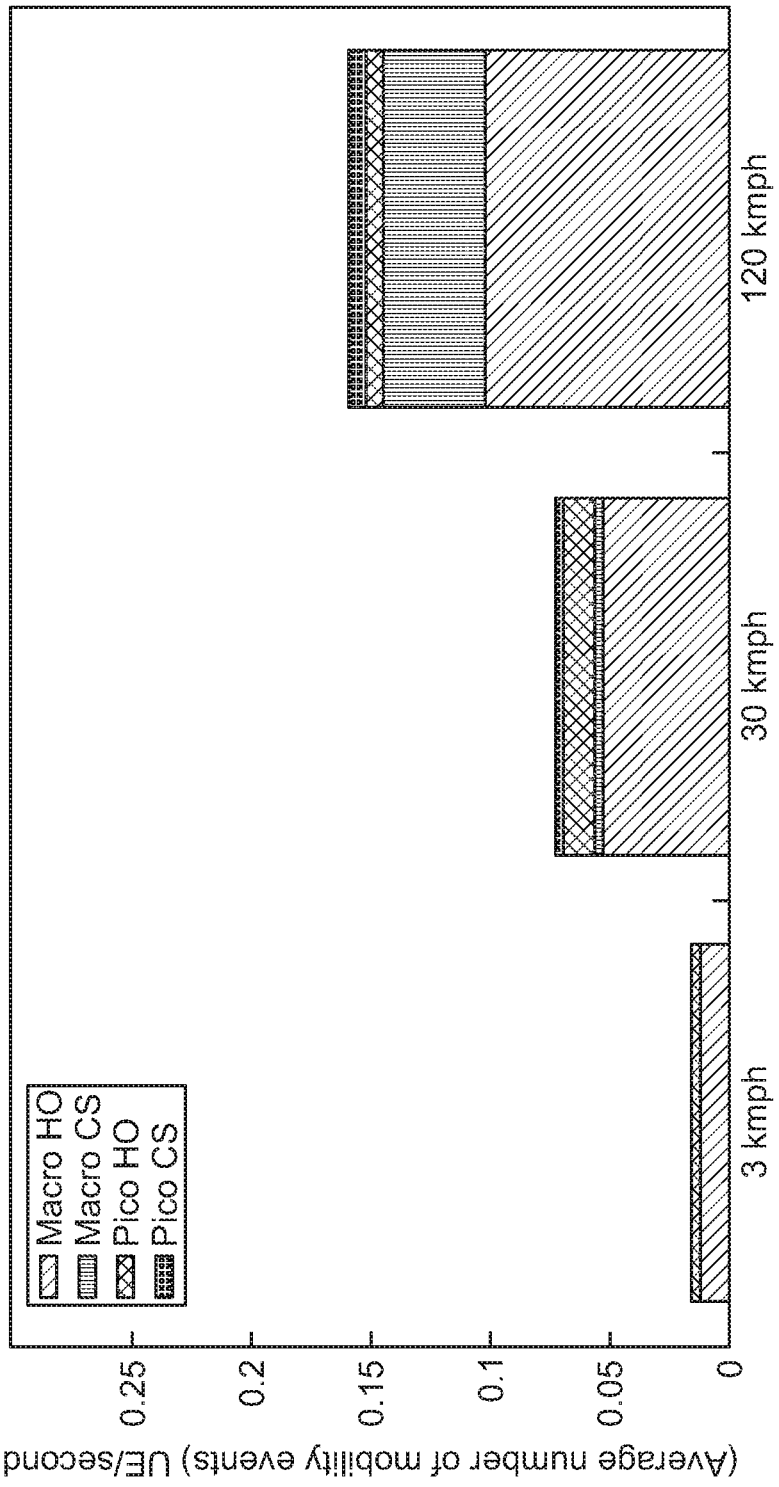
Figure 1C:
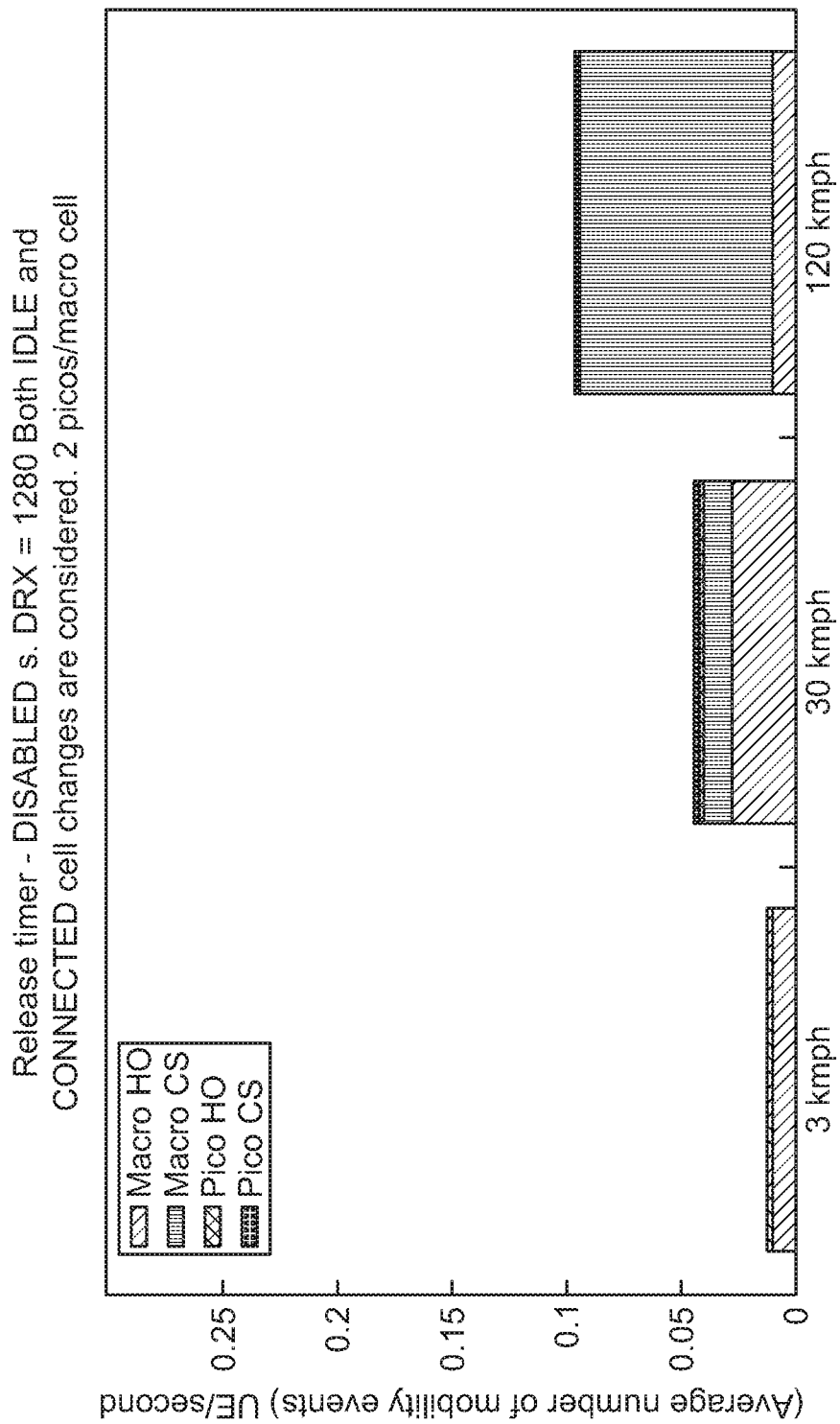

FIGS. 1a, 1b and 1c illustrate the average counted mobility events with three different DRX configurations: DRX disabled, DRX long cycle of 320 ms and DRX long cycle of 1280 ms. In this example, it can be assumed that the mobility itself (UE movement within the radio network) is the same regardless of the DRX configuration. Now, comparing the non-DRX results to the two cases with DRX configured, it can be observed that the counted mobility events become lower as DRX length increases. Also, the type of the mobility will change. Especially with higher UE speeds, the cell selections (CS) due to handover failures or radio link failures (RLFs) will increase. The handover (HO) failures are increased due to longer measurement window used for measurement event evaluation (triggering the measurement report and HO procedure). This type of mobility event actually becomes dominant with highest speed when the DRX cycle is longest. However, the general trend is that the total amount of mobility events is goes down as the DRX period is increased.

The results illustrated in FIGS. 1a-1c were simulated for a macro-pico scenario keeping the pico density constant. Similar results may also be observed in other network deployment scenarios confirming these conclusions.

Figure 2A:
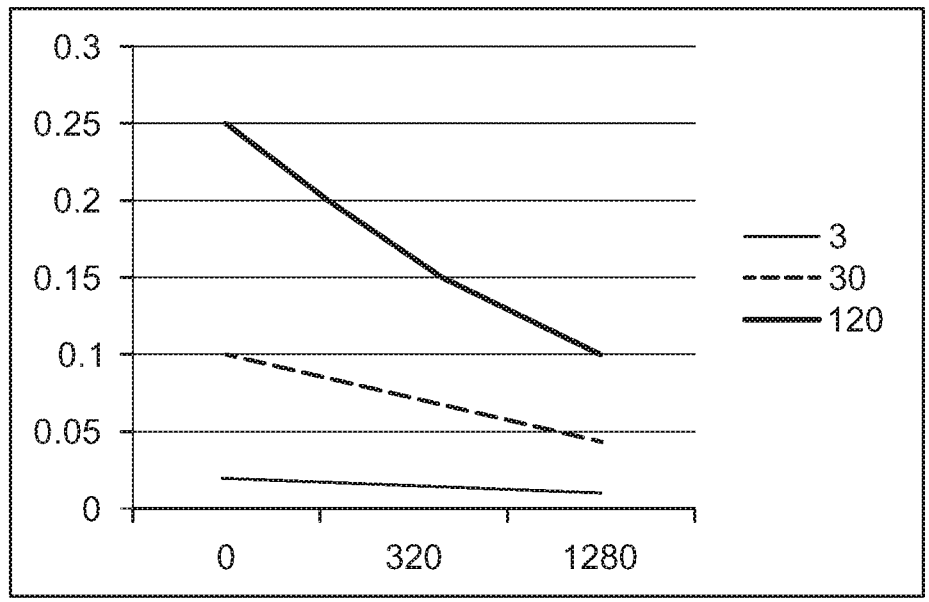
FIG. 2a illustrates the trend of how the measured cell change count is affected by the DRX configuration, according to an embodiment.

FIG. 2a illustrates the trend of how the measured cell change count is affected by the DRX configuration, according to an embodiment. In FIG. 2a, the scaling factor is shown as the Y-axis. FIG. 2a essentially illustrates the results in FIG. 1a through 1c, but in a different format. This behavior could be measured in real networks or simulated using network planning tools (or similar) to have a more accurate estimate the impact of the DRX cycle. Using such results, the scaling factor (shown on Y-axis) can be determined, here illustrated in FIG. 2b. The reference point can be the non-DRX case (no scaling, scaling factor=1). For DRX cases, the cell change counts can be obtained by multiplying the measured cell change count by the scaling factor. Then, the mobility state would be categorized (low, medium, high) using the thresholds defined for non-DRX case.

Figure 2B:
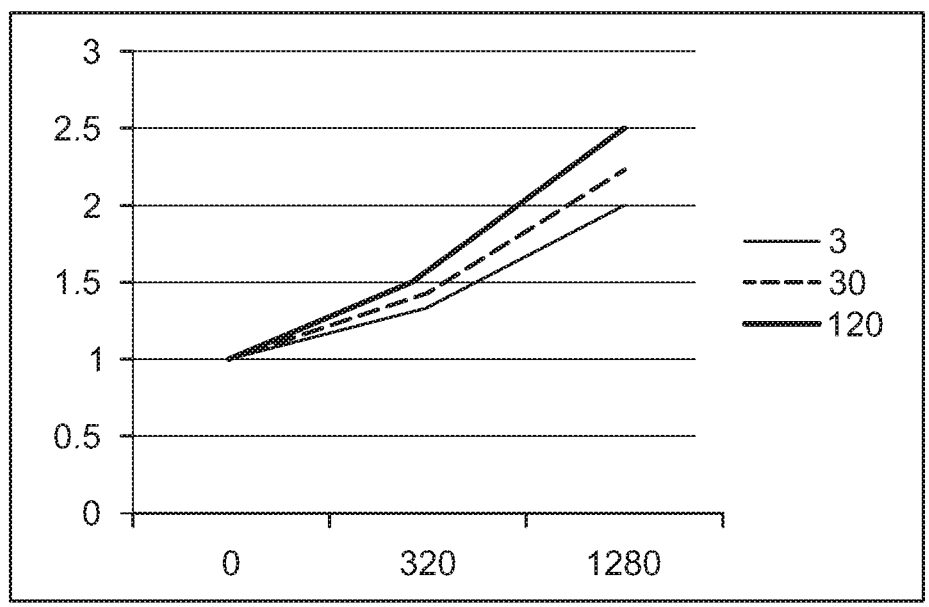
FIG. 2b illustrates the scaling factor based on DRX, according to an embodiment.

As can be seen from FIGS. 2a and 2b, there is a slight difference in the scaling factor depending on the actual UE speed. However, the difference is not considerable and an averaged value over all UE speeds may also be used. If there is an obvious maximum speed anticipated in a certain area, such as in an urban environment, the scaling factor for highest speeds can be omitted and realistic values can be used.

In one embodiment, the scaling may be done by the UE if the UE indicates the mobility state. In this example, the scaling factors can be provided to the UE either by the broadcasted information or by dedicated signaling. Alternatively, the scaling factors could be fixed and specified in the 3GPP standard(s).

In another embodiment, the UE signals the number of cell changes and the scaling can be done by the network node. This can be applicable for smart phone optimization where the format of the mobility indication is open.

According to certain embodiments, there may also be other parameters, such as radio resource control (RRC) connection release timer running in the radio access network node, that are taken into account when determining the scaling factor. In this way, the accuracy of the mobility estimate may be somewhat improved. However, in some embodiments, the extreme accuracy in the cell change count may not be needed as the thresholds may be fairly coarse compared to actual measurements. Therefore, in certain situations, it can be assumed that a fairly simple approach of the scaling function can result in targeted performance.

Figure 3A:
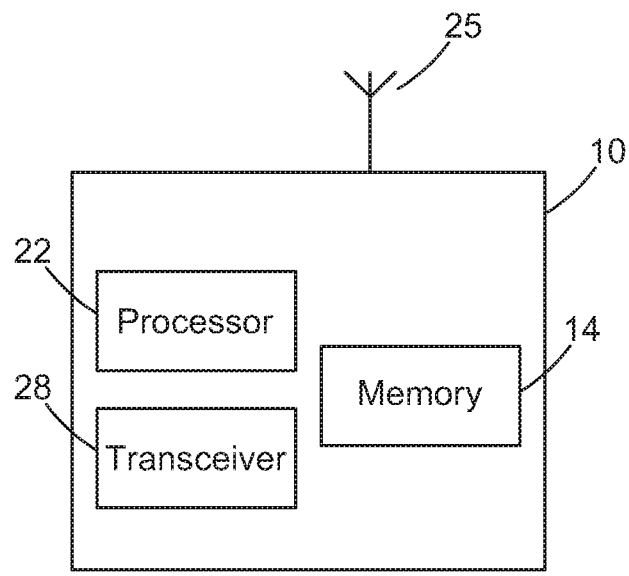
FIG. 3a illustrates an apparatus according to an embodiment.

FIG. 3a illustrates an example of an apparatus 10 according to an embodiment. In one embodiment, apparatus 10 may be a UE. It should be noted that one of ordinary skill in the art would understand that apparatus 10 may include components or features not shown in FIG. 3a. Only those components or feature necessary for illustration of the invention are depicted in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a UE. In an embodiment, apparatus 10 may be controlled by memory 14 and processor 22 to estimate a mobility state of apparatus 10 and to scale the mobility state estimate according to scaling factors. According to one embodiment, apparatus 10 may be controlled by memory 14 and processor 22 to receive the scaling factors from the network and to scale the mobility state estimate according, for example, to the received scaling factors and a number of cell changes. In some embodiments, apparatus 10 may be controlled by memory 14 and processor 22 to provide the scaled mobility state estimate to the network.

Figure 3B:
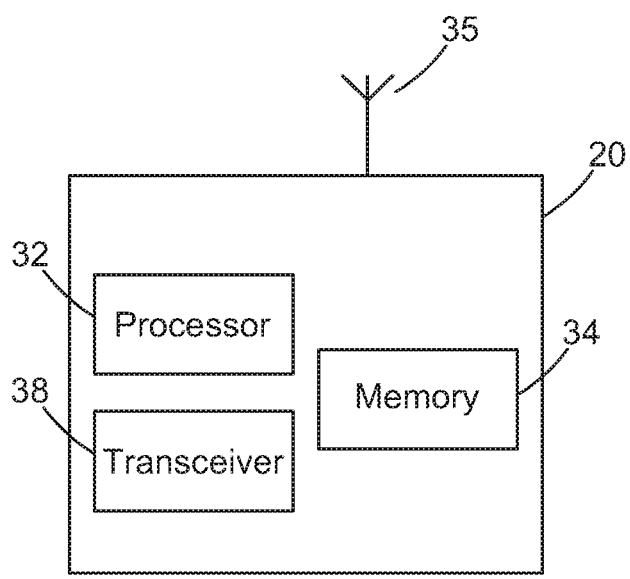
FIG. 3b illustrates an apparatus according to another embodiment.

FIG. 3b illustrates an example of an apparatus 20 according to another embodiment. In an embodiment, apparatus 20 may be a network node, such as an eNB. It should be noted that one of ordinary skill in the art would understand that apparatus 20 may include components or features not shown in FIG. 3b. Only those components or feature necessary for illustration of the invention are depicted in FIG. 3b.

As illustrated in FIG. 3b, apparatus 20 includes a processor 32 for processing information and executing instructions or operations. Processor 32 may be any type of general or specific purpose processor. While a single processor 32 is shown in FIG. 3b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulates information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a network node, such as an eNB. In this embodiment, apparatus 20 may be controlled by memory 34 and processor 32 to receive a number of cell changes from a user equipment. Apparatus 20 may then be controlled by memory 34 and processor 32 to determine the scaling factors, and to scale a mobility state estimate of the user equipment according, for example, to the scaling factors and the received number of cell changes.

Figure 4:
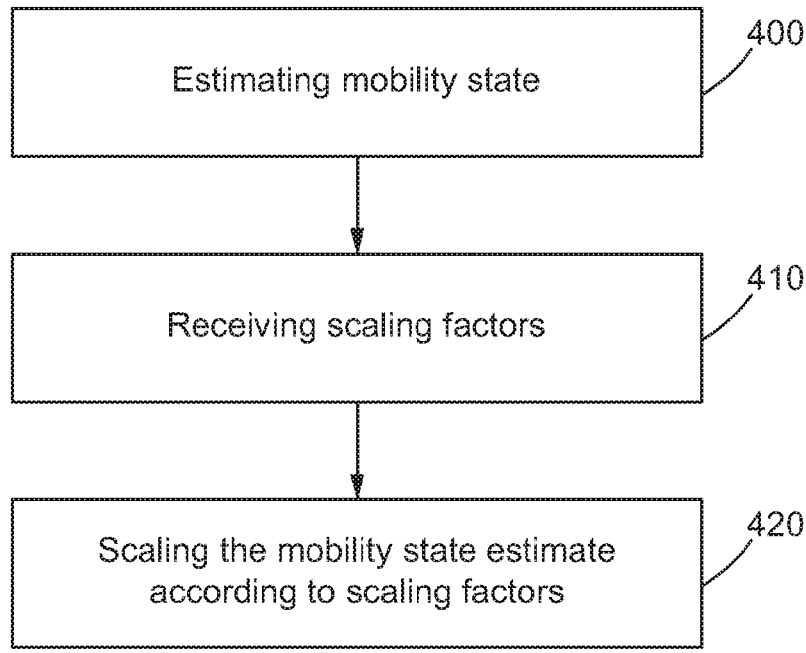
FIG. 4 illustrates a flow diagram of a method according to one embodiment.

FIG. 4 illustrates an example of a flow diagram of a method, according to one embodiment. The method may include, at 400, estimating a mobility state of a user equipment. At 410, the method may include receiving scaling factors from the network. The method may then include, at 420, scaling the mobility state estimate according, for example, to the scaling factors and a number of cell changes.

Figure 5:
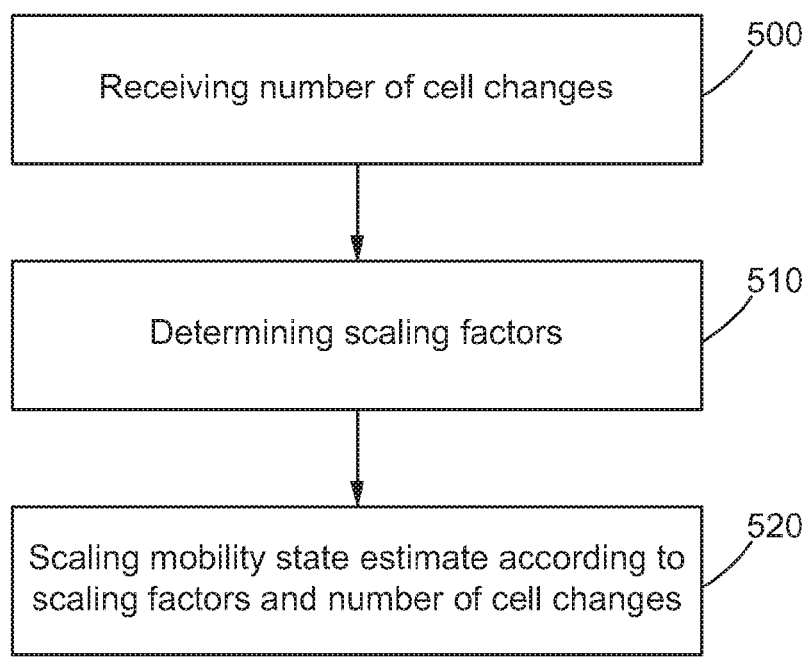
FIG. 5 illustrates a flow diagram of a method according to another embodiment.

FIG. 5 illustrates an example of a flow diagram of a method, according to one embodiment. The method may include, at 500, receiving a number of cell changes from a user equipment. In some embodiments, the method may also include estimating, by the eNB, the UE mobility state based on, for example, counting the cell changes, receiving cell change information from other eNB (former source cell), etc. The method may then include, at 510, determining scaling factors and, at 520, scaling a mobility state estimate of the user equipment according, for example, to the scaling factors and the received number of cell changes.

In some embodiments, the functionality of any of the methods described herein, such as those illustrated in FIGS. 4 and 5 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Certain embodiments of the invention provide several advantages. For example, some embodiments can provide a more accurate and realistic mobility state estimate. In addition, certain embodiments may provide better working optimization functions (e.g., mobility optimization, smart phone optimization, etc.) having better inputs for the decisions.

In view of the above, one embodiment may include a system configured to estimate a mobility state of a user equipment. The system may be further configured to scale the estimate of the mobility state according to certain factors. In one embodiment, the factors may include a DRX cycle applied during the period of estimation of the mobility state and the number of cell changes of the user equipment.

Another embodiment may include an apparatus including at least one processor and at least one memory including computer program code. The at least one memory and the computer program code may be configured, with the at least one processor, to cause the apparatus at least to estimate a mobility state of the apparatus and to scale the mobility state estimate according to scaling factors. According to one embodiment, the at least one memory and the computer program code may be further configured, with the at least one processor, to cause the apparatus to receive the scaling factors from the network and to scale the mobility state estimate according, for example, to the received scaling factors, a DRX cycle applied during the period of estimation of the mobility state, and a number of cell changes. In some embodiments, the apparatus may be configured to provide the scaled mobility state estimate to the network or eNB.

Another embodiment may include an apparatus including at least one processor and at least one memory including computer program code. The at least one memory and the computer program code may be configured, with the at least one processor, to cause the apparatus at least to receive a number of cell changes from a user equipment, to determine the scaling factors, and to scale a mobility state estimate of the user equipment according, for example, to the scaling factors and the received number of cell changes.

Another embodiment may include a method for mobility estimation. The method may include estimating a mobility state of a user equipment, receiving scaling factors from the network, and scaling the mobility state estimate according, for example, to the scaling factors, a DRX cycle applied during the period of estimation of the mobility state, and a number of cell changes.

Another embodiment may include a method for mobility estimation. The method may include receiving a number of cell changes from a user equipment. The method may then include determining scaling factors and, scaling a mobility state estimate of the user equipment according, for example, to the scaling factors and the received number of cell changes.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
at least one processor; and
at least one memory including computer program code,
  wherein the at least one memory and the computer program code are configured, with the at least one processor, to cause the apparatus at least to
determine a number of cell changes of a user equipment;
estimate a mobility state of the user equipment associated with a network;
determine at least one scaling factor; and
scale the mobility state estimate, which is based on the number of cell changes of the user equipment, according to the at least one scaling factor,
  wherein the mobility state estimate is based on the number of cell changes of the user equipment, and the at least one scaling factor is determined based on discontinuous reception during a period of the estimation.

2. The apparatus according to claim 1, wherein the scaling of the mobility state estimate is done by the user equipment or by a network node.

3. The apparatus according to claim 1, wherein the discontinuous reception is configured at least to one of an idle state or a connected state.

4. The apparatus according to claim 3, wherein the mobility state is estimated at least during one of the idle state, connected state, or both states.

5. The apparatus according to claim 1, wherein the at least one memory and the computer program code are further configured, with the at least one processor, to cause the apparatus at least to scale the mobility state estimate according to a number of cell changes of the user equipment.

6. The apparatus according to claim 1, wherein the at least one memory and the computer program code are further configured, with the at least one processor, to cause the apparatus at least to scale the mobility state estimate according to a discontinuous reception (DRX) cycle applied during a period of estimation of the mobility state.

7. The apparatus according to claim 1, wherein the at least one memory and the computer program code are further configured, with the at least one processor, to cause the apparatus at least to transmit the scaled mobility state estimate to the network.

8. The apparatus according to claim 1, wherein the at least one memory and the computer program code are further configured, with the at least one processor, to cause the apparatus at least to use the scaled mobility state estimate at the user equipment.

9. The apparatus according to claim 6, wherein the discontinuous reception (DRX) cycle comprises one of a paging cycle in an idle state or DRX cycle in a connected state when configured.

10. The apparatus according to claim 9, wherein the idle state re-selections based on the paging cycle and the connected state handovers with applied DRX cycle are scaled separately.

11. The apparatus according to claim 1, wherein the apparatus comprises a user equipment.

12. The apparatus according to claim 5, wherein, when a discontinuous reception (DRX) is applied, the number of cell changes will be lower for a given time period and thresholds are adapted accordingly.

13. The apparatus according to claim 1, wherein the scaling is done for thresholds used to separate the mobility states.

14. An apparatus, comprising:
at least one processor; and
at least one memory including computer program code,
wherein the at least one memory and the computer program code are configured, with the at least one processor, to cause the apparatus at least to
receive a number of cell changes from a user equipment;
estimate a mobility state of the user equipment associated with a network;
determine scaling factors; and
scale a mobility state estimate of the user equipment according to the scaling factors and the received number of cell changes,
wherein the mobility state estimate is based on the number of cell changes of the user equipment, and the scaling factors are determined based on discontinuous reception during a period of the estimation.

15. The apparatus according to claim 14, wherein the apparatus comprises an enhanced node B (eNB).

16. The apparatus according to claim 14, wherein the at least one memory and the computer program code are further configured, with the at least one processor, to cause the apparatus at least to receive cell change information from at least one other enhanced node B (eNB).

17. A method, comprising:
determining a number of cell changes of a user equipment;
estimating a mobility state of the user equipment associated with a network;
determining at least one scaling factor; and
scaling the mobility state estimate, which is based on a number of cell changes of the user equipment, according to the at least one scaling factor,
wherein the mobility state estimate is based on the number of cell changes of the user equipment, and the at least one scaling factor is determined based on discontinuous reception during a period of the estimation.

18. The method according to claim 17, further comprising scaling the mobility state estimate according to a number of cell changes of the user equipment.

19. The method according to claim 17, wherein the discontinuous reception is configured at least to one of an idle state or a connected state.

20. The method according to claim 17, further comprising scaling the mobility state estimate according to a discontinuous reception (DRX) cycle applied during a period of estimation of the mobility state.

* * * * *